United States Patent [19]

Craven

[11] Patent Number: 4,570,732
[45] Date of Patent: Feb. 18, 1986

[54] MOTOR DRIVEN GOLF BAG CART

[76] Inventor: Charles G. Craven, 2231 Central St., Stoughton, Mass. 02072

[21] Appl. No.: 643,249

[22] Filed: Aug. 22, 1984

[51] Int. Cl.[4] .............................................. B62D 51/04
[52] U.S. Cl. .................................. 180/19.3; 180/65.1; 280/DIG. 6
[58] Field of Search ...................... 180/19.3, 19.1, 11, 180/65.1; 280/DIG. 6

[56] References Cited

U.S. PATENT DOCUMENTS

| 3,719,247 | 3/1973 | Hollis | 280/DIG. 5 X |
| 3,952,821 | 4/1976 | Craven | 180/19.3 |
| 3,989,116 | 11/1976 | Hirano | 180/19.3 |
| 4,106,583 | 8/1978 | Nemeth | 180/19.3 X |

Primary Examiner—William E. Wayner

[57] ABSTRACT

A golf bag cart has a base supported at its front end by a pair of drive wheels and at its rear center by a trailing wheel above which the base is provided with a seat for a golf bag. Forwardly of the base the cart has a support inclined forwardly at an angle of approximately 75° and extending forwardly of the front of the base and provided with a transverse, rotatable handle. A reversible motor mounted on the base is powered by a storage battery and is of a type provided with a gear box having transversely aligned shafts each of which is connected by an over-running clutch to the appropriate one of the drive wheels. The cart is provided with a control circuit including a variable speed control by which the operator can control both the motor speed and its direction with the motor speed controlled by turning the handle to establish a selected rate of travel and motor direction controlled by a separate switch.

4 Claims, 4 Drawing Figures

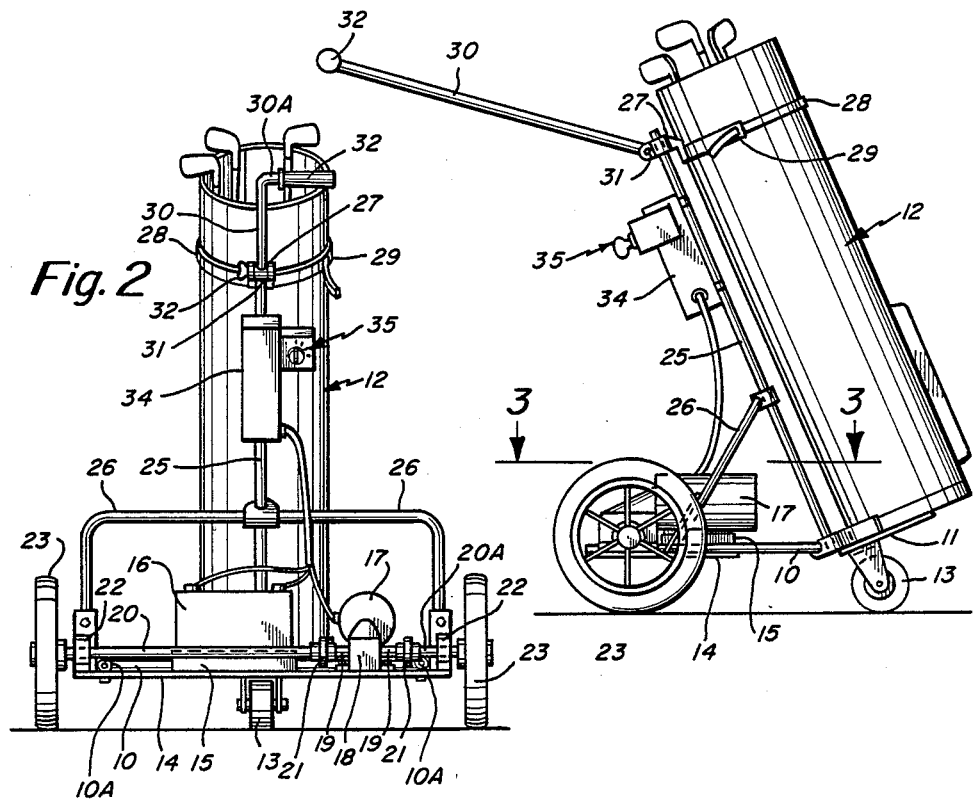
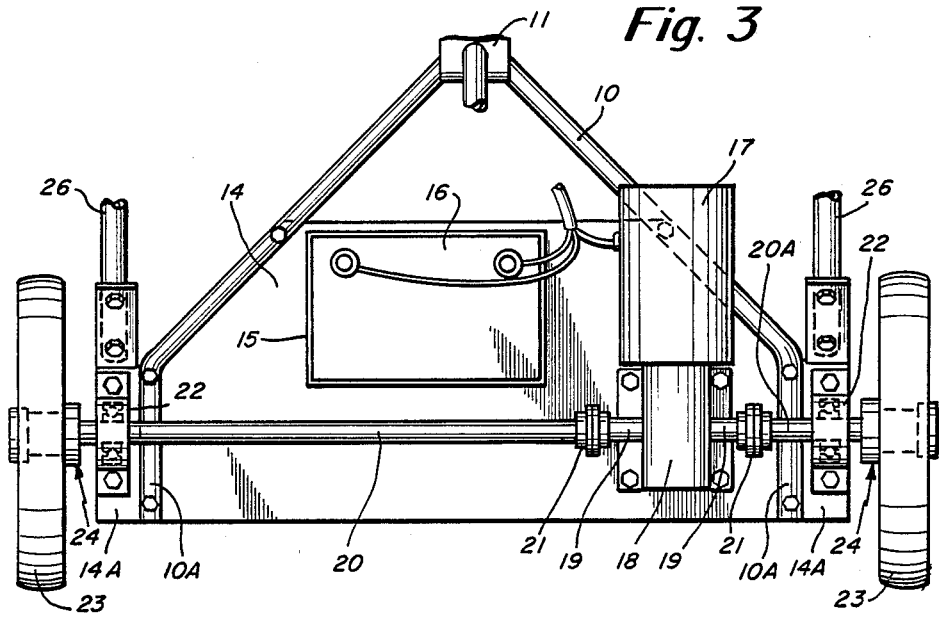

MOTOR DRIVEN GOLF BAG CART

BACKGROUND OF THE INVENTION

Golf bags containing a full set of clubs are heavy and as many golfers prefer to walk the golf courses, golf bag carts of either a two wheel or a tricycle type are widely used. Such carts are either manually moved or provided with a battery powered drive.

A two wheeled cart with such a drive is illustrated by my U.S. Pat. No. 3,952,821 while carts of the tricycle type equipped with such drives are illustrated by U.S. Pat. No. 4,427,084 and by the above cited publication. While such carts have controls by which their rate of travel can be manually controlled, in all, the speed controls are located adjacent to the handle by which the direction of the carts is determined.

THE PRESENT INVENTION

The general objective of the present invention is to provide a golf cart of the tricycle type which is of a suitable light weight construction and attractive appearance and is provided with a superior basis of control and operation.

One such objective is attained by providing a golf cart having a triangular, horizontal frame the apex of which is at the rear and has a rearwardly and upwardly inclined seat for the bottom of a golf bag and to which a subjacent rear wheel is connected. The front of the frame is supported by a pair of larger wheels connected to transversely aligned drive shafts of a reversible drive through clutches of an over-running type. The frame supports a plate on which the battery is seated and on which the reversible motor is mounted. The motor is of the type having a gear box provided with transversely aligned shafts which, in practice, are connected to the drive shafts by flexible couplings. The bag seat has an upwardly and forwardly inclined braced support to which the upper end of a seated golf bag is secured with the support and the seat so disposed that the bag is held forwardly inclined at an angle relative to the plate in the approximate range of 70° to 80°. The support has an arm pivotally connected to its upper end which, in use, extends forwardly of the front wheels and is locked in a position to place a transversely disposed handle at its free end at a height relative to the ground that enables the handle to be conveniently held by the user.

Another important objective is attained with the handle rotatable and the means by which the circuit to the motor may be opened and predetermined different rates of travel established. The circuit has a variable speed control of the pulse width modulated type to ensure the conservation of battery power. When the motor circuit is open, the over-running clutches permit the cart to be manually moved in a forward direction only, if wanted or necessary. While the rate of cart travel may be easily adjusted by the hand that is guiding the cart, the direction in which the motor is driven is determined by the position of a switch preferably so located that the user must turn off the drive and set that switch, which is also an off - on switch, to establish the wanted direction of motor operation.

PRIOR ART STATEMENT

The cited prior art which has been discussed above, is the most pertinent prior art known to applicant and does not disclose the previously discussed features as set forth in the claims.

BRIEF DESCRIPTION OF THE DRAWINGS

The accompanying drawings illustrate a preferred embodiment of the invention of which FIG. 1 is a side view of the golf bag cart with a bag attached thereto;

FIG. 2 is a front end view thereof;

FIG. 3 is a section, on an increase in scale, taken approximately along the indicated line 3—3 of FIG. 1.

THE PREFERRED EMBODIMENT OF THE INVENTION

Figure 4:
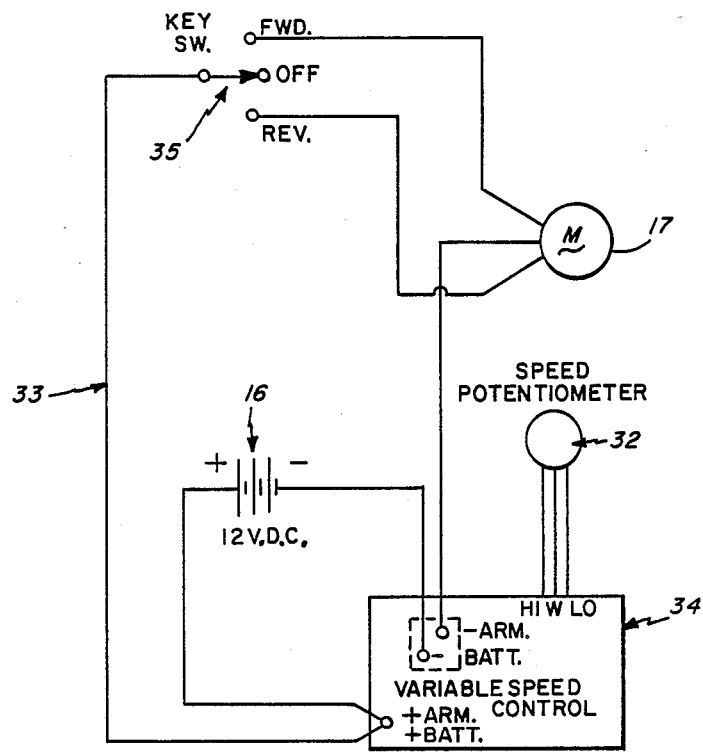
FIG. 4 is a schematic view of the circuitry.

The golf bag cart illustrated by the drawings has a triangular horizontal frame 10 the apex of which is rearwardly disposed and includes a rearwardly and upwardly inclined seat 11 for the bottom of a golf bag, generally indicated at 12. A trailing wheel 13 is secured to the undersurface of the seat 11. Front ends 10A of the frame are straight and parallel and a plate 14 is secured to the undersurface of the front portion of the frame and is shaped and dimensioned to protrude laterally of the frame ends 10A to provide supports 14A. The plate 14 has a seat 15 for a 12 volt storage battery 16 and also supports a reversible motor 17 shown as of the type having a gear box 18 provided with oppositely disposed, transversely aligned shafts 19.

The shafts 19 are connected to drive shafts 20 and 20A by flexible couplings 21 with each drive shaft 20 supported by a bearing unit 22 mounted on the appropriate one of the supports 14A. Each shaft 20 is connected to a drive wheel 23 through a clutch, generally indicated at 24, and of a type engaged when the motor 17 is operating in either direction and permits the cart to be freely moved in a forward direction only by the user, if such movement is wanted, even to the extent of overriding the established forward speed.

A support 25 mounted on the front portion of the seat 11 is forwardly and upwardly inclined and is held against the weight of the bag 12 by braces 26 anchored to the supports 14A. The angle at which the support is inclined relative to the frame 10 is in the approximate range of 70° to 80° with an angle of approximately 75° preferred. The bag 12 is thus held with its center of gravity well forwardly of the trailing wheel 13 with its contained clubs conveniently accessible.

The upper end of the support 25 is close to but rearwardly of a vertical plane inclusive of the axes of the drive wheels 23 and has a bracket 27 fixed thereon to which a strap 28 is attached and which encircles and secures the upper portion of the seated bag when its ends are interconnected by the buckle 29. One end of an arm 30 is connected to the bracket 27 by a pivot 31 and is locked in any wanted position relative to the support 25 as by means of a wing nut 31A threaded on the pivot 31.

The other end 30A of the arm 30 is laterally disposed and supports a rotatable handle 32 which is not only the means by which the user steers the cart but the means by which the cart speed is controlled or travel of the cart halted. The length of the arm 30 is such that when positioned for use, the handle 32 is located well ahead of the wheels 23 but is less than the distance between the pivot 31 and the ground when the arm 30 is not to be used.

As previously stated, the handle 32 controls the motor speed and in practice, its turning triggers the circuit, generally indicated at 33 to vary motor speeds between zero and the maximum.

The circuit 33, see FIG. 4, includes the handle 32 as the speed potentiometer in control of the variable speed control of the pulse width modulated type, generally indicated at 34, such as the 65 series manufactured by Dart Controls, Inc. of Zionsville, Ind. Such controls vary battery voltage with motor speeds to increase the running time of the battery 16. The circuit 33 also includes a switch having an "off" position, a position in which the motor speed is in a forward direction and a position in which the motor speed is reversed. It is preferred that the switch 35 be key operated and in practice is located at one side of the control 34 which is mounted on the support 25 in a position such that the user must turn the handle 32 to a "stop" or "zero" position to open the circuit 33 before the motor direction can be changed.

I claim:

1. A motor driven golf bag cart of the tricycle type, said cart including a base consisting of a V-shaped member the apex of which is rearwardly disposed, a plate anchored to the forward position of said member, bag supporting means secured to said apex and including a rearwardly extending and upwardly inclined bag seat, an underlying trailing wheel attached to said seat and a forwardly and upwardly inclined member including a supporting portion and a guide portion extending forwardly of the front edge of said plate, said bag supporting means operable to hold a bag with the upper end thereof rearwardly of said front edge, a reversible motor and gear box mounted on said plate adjacent said edge, said gear box having transversely aligned drive shafts, said plate including means adjacent each side edge rotatably supporting the appropriate one of said shafts, a wheel for each shaft, one way clutch means connecting each wheel to the shafts therefor, brace means connected to an intermediate part of said supporting portion and the side portions of said plate, a drive for said motor including a battery supported by said plate rearwardly of the axis of said shafts, and control circuitry connecting said battery to said motor and including a pulse moderating control, a potentiometer, and a motor direction control mounted on one of said portions of said forwardly and upwardly inclined member.

2. The motor driven golf bag cart of claim 1 in which the margins of the plate extend laterally of the front part of the V-shaped member, on which the means rotatably supporting the shaft are mounted and to which the brace means are secured.

3. The motor driven golf bag cart of claim 1 in which the supporting portion of the forwardly and upwardly inclined member defines an angle relative to the plate in the approximate range of 70° to 80°.

4. The motor driven golf bag cart of claim 3 in which the angle is approximately 75°.

* * * * *